UNITED STATES PATENT OFFICE.

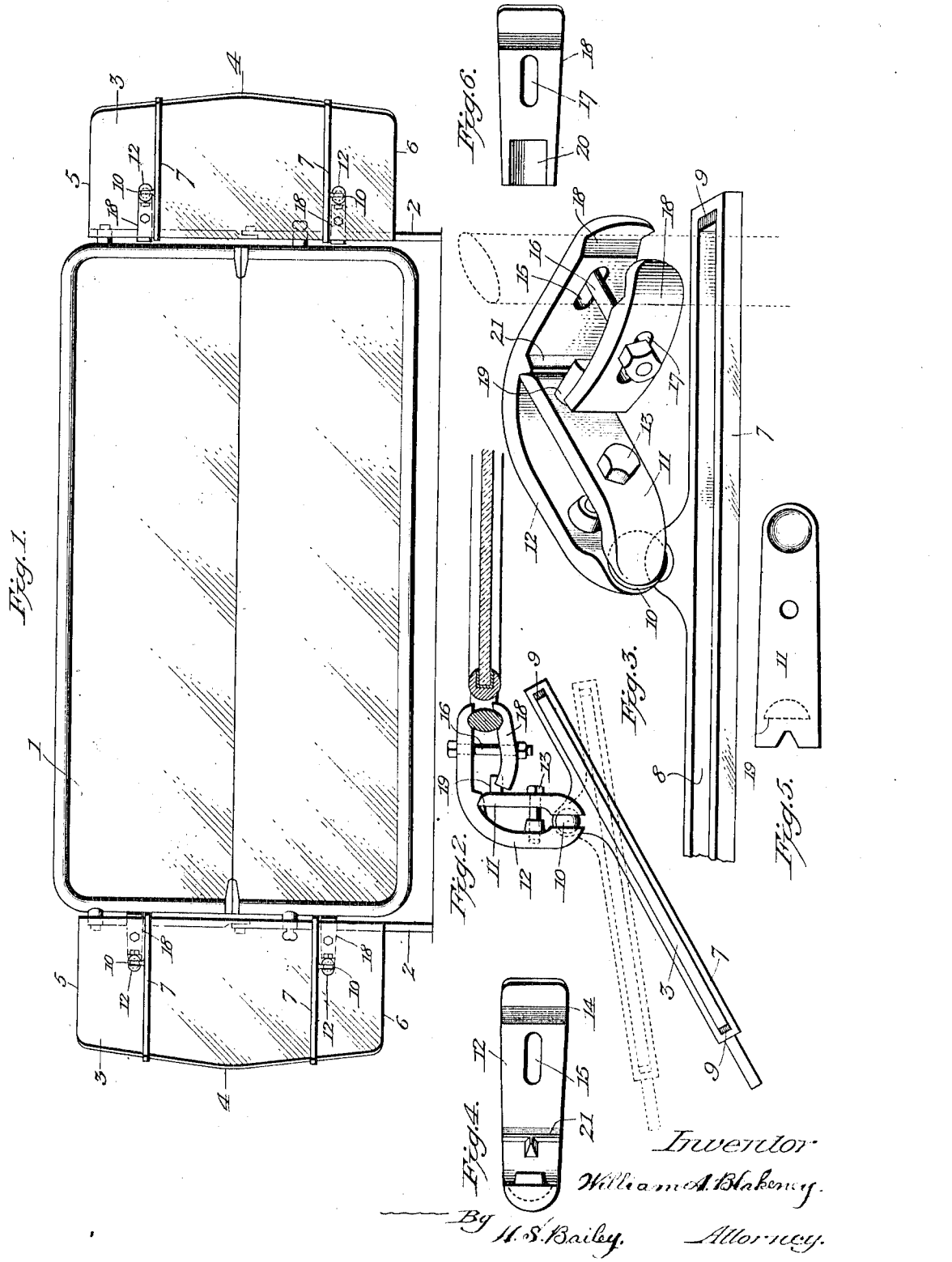

WILLIAM A. BLAKENEY, OF DENVER, COLORADO.

TRANSPARENT WINDSHIELD WING FOR AUTOMOBILES.

1,408,436.  Specification of Letters Patent.  Patented Mar. 7, 1922.

Application filed November 19, 1920. Serial No. 425,126.

*To all whom it may concern:*

Be it known that I, WILLIAM A. BLAKENEY, a citizen of the United States of America, residing at the city and county of Denver and State of Colorado, have invented a new and useful Transparent Windshield Wing for Automobiles, of which the following is a specification.

My invention relates to a new and improved type of transparent wind shield wings for automobiles.

And the objects of my invention are:

First: to provide a transparent wind shield wing that is adapted to be adjustably secured laterally and vertically to the supporting standards at the opposite ends of the wind shields of automobiles.

Second: to provide a wind shield wing for the opposite sides of the wind shields of automobiles, that comprises a sheet of plate glass that is supported and secured to the supporting standards of the wind shield in such a manner that the entire center portion of the glass is unobscured by rods or clamps to the vision of the eye of the occupants of an automobile, and that can be swingingly adjusted into any desired angular position to the wind shield.

Third: to provide a transparent wind shield wing, the supporting members of which support the wind shield on both sides of it across its entire width and also on its opposite edges, and in which the shape of the transparent wind shield at its end portions is such that they cooperatingly unite when operatively secured to the supporting standards of the wind shield of the automobile to prevent displacement of the shield supporting members from the transparent shield, or the transparent shield from its supporting members. And Fourth: to provide a simple, inexpensive, easily applied and adjusted wind shield of attractive appearance and that has an unobstructed transparent field between its upper and lower supports, and that is supported in ball and socket joints that are so arranged that the transparent shield is held by a frictional clamping pressure that enables it to be pivotally turned or tilted on its ball and socket joint to stand at an oblique angle desired to the occupants of the automobile, without loosening any of the connections of its supporting members.

I attain these objects by the mechanism illustrated in the accompanying drawings, in which:

Figure 1 is a front elevation of an automobile wind shield, showing wings in connection therewith, and the improved means for securing said wings to the wind shield supporting standards.

Fig. 2 is an enlarged top view of the left hand wing and its supporting means, the standard and wind shield being in section.

Fig. 3 is an enlarged perspective view of one of the fastening devices for the wing, detached.

Fig. 4 is a front view of the main member of the fastening device.

Fig. 5 is a side view of the member which cooperates with the main member, in supporting the wing holders; and Fig. 6 is a side view of the cooperating clamp which acts in conjunction with the main member in clamping the wing supporting mechanism to the wind shield standards.

Similar letters of reference refer to similar parts throughout the several views.

Referring to the drawings:

The numeral 1, designates the wind shield of an automobile, to the vertical supporting standards 2, of which my transparent wind shield wings are secured.

My transparent wind shield wings are each composed of a sheet of plate glass 3, of from about eighteen inches to twenty-four inches in length, the inner edge of which is preferably made straight, and its outer edge tapers from its center 4, which is preferably from about eight to twelve inches wide to its opposite ends 5, and 6, which are preferably from about seven to nine inches wide.

My glass wind shield wings are each held and are firmly supported at its opposite end portions, and is surrounded by long rectangular-loop-shaped bars of metal 7, each of which is provided with a long slot 8, which fits over, and through which the opposite end portions of the glass plate 3 extend a short distance, of preferably from about three and one-half to four and one-half inches, where they are clampingly held and secured in place by flexible wedges 9, that are pressed between their tapering edges which bind the glass and the loop-shaped bars together.

Each one of the slotted bars is provided with a projecting ball 10, that is positioned at about one-third of the length of each of the slotted bars, but the ball on the upper slotted bar preferably projects upwardly and the ball on the lower slotted bar preferably projects downwardly. These two balls fit into segmental spherical recesses that are formed partially in the opposing ends of a lever 11, and a truss arm 12, which are arranged to partially surround the balls and are clamped tightly to the balls by a cap scew 13, which extends loosely through the clamping lever 11, and is threaded into the truss arm 12.

This truss arm 12, is of arch shape, and it extends from the balls over to and rests on the adjacent standard 2, of the wind shield of the automobile, and its outer end is bent down and a V-shaped notch 14, is formed in it that straddles and fits against the round surface of the standard 2.

This curved truss arm is provided with an elongated hole 15, through which a bolt 16, extends loosely, and this bolt also extends loosely through an elongated hole 17, that is formed in a short lever 18, the outer end of which is notched to fit over and against the surface of the standard 2, of the wind shield of the automobile, and its opposite end bears against the top surface of a lug 19, that is formed on the adjacent side of the lever 11, and in order that the end of the lever 18, may rest securely on the lug 19, against accidental displacement, its underside is provided with a recess 20, which permits the end of the lever 18, to fit down over the sides of the lug.

The outer end of the lever 11, from the ball it partially surrounds, is not only clamped against the inside of the curved truss arm 12, by the cap screw 13, but it toes against and is clamped against a lug 21, that is formed on the inside of the truss arm 12, by the bolt 16. This curved outer lever arm and the two short levers within its radius form a truss of great strength and stiffness for clamping and holding the ball of each of the slotted shield bars rigidly and at the same time so that the glass, with its supporting bars and their ball joint portions can be turned in the ball sockets formed partially in each of the ends of the curved arm 12, and of the lever 11.

The top and the bottom glass holding slotted bars and their wind shield standard gripping and supporting trussed arm mechanism are entirely independent of each other, but at the same time the glass cannot work downwardly in the lower slotted cross bar which entirely surrounds it, as the outwardly and upwardly tapering outer edge of the glass wind shield is wedged in it and against its opposite edges and the jolting of the automobile when running only tends to make the opposite edges of the glass shield fit tighter in the lower cross bar, while the jarring movement of the automobile when running tends to settle the upper cross bar down on the opposite edges of the glass wind shield, thus tightening it onto its opposite edges, and as the upper and the lower cross bars are not connected to each other by any vertical rods or bars or levers, the whole central surface of the glass wind shield presents a clear and unobstructed view to the vision of the driver and also to the occupants of the automobile.

The supporting trusses of the glass wind shield, on account of their being independent of each other, can be vertically adjusted on the standards of the wind shield of the automobile to fit any height or length of glass wind shield it is desired to use on an automobile.

The operation of securing my glass wind shield to the side supporting standards of the wind shield of an automobile is as follows:

The slotted cross bars are first placed over the ends of the glass plate, and after short pieces of a flexible material, such as neolin or rubber, are placed in their opposite ends, they are pressed against the widening edges of the glass, which is cut of a width that allows these cross bars to fit tightly against the edges of the glass at from about three to four inches from each of its opposite ends. The ball and socket joint connection is then made between each truss arm, and the ball of each cross bar, and the ends of the curved arm and of the lever are clamped tight enough together to hold the glass from accidentally turning with its ball in the socket of the truss arm, and tight enough so that the glass cannot be turned except that the glass be grasped with the cross bars by both hands and considerable strength applied to them. The glass, however, is set at any desired angle to the wind shield of the automobile and to suit the desires of the occupants of the automobile to ward off and prevent the wind from entering the automobile, and is left in that adjusted position.

Having secured the cross bars to the glass wind shield and the truss arms to the cross bars, the inner ends of the truss bars are placed on the standards and are adjusted vertically on them to position the wind shield at the height desired to keep the wind out of the automobile, and then the clamping bolts 20, are tightened to rigidly secure the truss arms to the standards.

My improved wind shield wing provides a simple, inexpensive device that can be adjusted by the hands of the driver or by an occupant of the automobile, and while I have illustrated and described the preferred construction and arrangement of my invention, I do not wish to be limited to it, as changes may be made without departing from the spirit of my invention.

Having described my invention, what I claim as new and desire to secure by Letters Patent, is 1. In a wind shield wing, the combination of the glass plate, with a slotted bar secured to each of the opposite end portions of said glass and provided with a joint forming ball, and means including an arm connected at one end to the wind shield standard of an automobile, and a ball and recess joint connection between the opposite end of said arm and said glass plate supporting slotted bars, said glass plate having its outer edge tapering smaller from the center of its length to its opposite ends, said arm comprising a curved shaped lever arm arranged to fit on the standard of the car at one end and having a portion of a spherical shaped recess at its opposite end, a lever bearing at one end against the inner side of said curved lever, and having a portion of a spherical recess arranged opposite to the recess in said lever arm fitting said ball, and means for securing the opposite end of said lever arm to said standard.

2. In a wind shield wing, the combination of the glass plate, with a slotted bar secured to each of the opposite end portions of said glass, and means including an arm connected at one end to the wind shield standard of an automobile, and a frictional joint connection between the opposite end of said arm and said glass plate supporting slotted bars, said glass plate having its outer edge tapering smaller from the center of its length to its opposite ends, said arm comprising a curved shaped lever arm arranged to fit on the standard of the car at one end and having a portion of a spherical shaped recess at its opposite end, a lever bearing at one end against the inner side of said curved lever, and having a portion of a spherical recess arranged opposite to the recess in said lever arm, and means for securing the opposite end of said lever arm to said standard, said frictional joint between said glass supporting slotted cross bars and the wind shield standard attaching trussed arm comprising a ball and socket frictional gripping joint between said slotted glass supporting bars and the recessed ends of said trussed arm.

3. In a structure as specified in claim 2 said standard clamping curved lever arm being positioned within the curved side of said curved lever arm, and having one of its ends recessed to fit over said standard, and its opposite end arranged to engage said ball clamping lever, and a bolt extending through said curved lever and its cooperating standard engaging lever and arranged to clamp them tightly to said standard, said slotted bars being provided with a ball fitting the socket formed in the ends of said levers.

4. In a structure as specified in claim 3, said curved lever arm being provided with a projecting lug arranged to form an abutment for the end of said ball lever, and against which the end of said ball engaging lever bears.

5. In a structure as specified in claim 4, said ball engaging lever being provided with a projecting lug, and said standard engaging lever being provided with a recess in its end, arranged to permit said standard engaging lever to fit over said lug, whereby said standard engaging lever cannot become accidentally disengaged from said ball engaging lever, and said ball engaging lever is held in alinement with said curved lever ball engaging lever, and all three lever members form a curved truss that supports the glass wind shield from the said standard.

6. The combination with a windshield wing support, having a spherical projection, of clamps having recesses in their ends, and means for clamping said recessed ends upon said projection, one of said clamps having a right angled extension; a third clamp acting in conjunction with said right angled extension, and means for clamping said third clamp and said extension upon an object.

7. The combination with a slotted support for receiving the end of a windshield wing, and provided with a projecting ball, of clamps having recessed ends for engaging said ball, and a screw for drawing said clamps together, one of said clamps having a right angled extension, the other having a lug on its inner end, a third clamp acting in clamping conjunction with the said right angled extension, its inner end resting on said lug, and a screw which passes through said extension and said third clamp for clamping their free ends upon an object.

In testimony whereof I affix my signature in presence of two witnesses.

WILLIAM A. BLAKENEY.

Witnesses:
G. SARGENT ELLIOTT,
ELIZABETH SMITH.